US008545311B2

(12) United States Patent
Shore et al.

(10) Patent No.: US 8,545,311 B2
(45) Date of Patent: Oct. 1, 2013

(54) SYSTEMS AND METHODS FOR ENABLING REMOTE DEVICE USERS TO WAGER ON MICRO EVENTS OF GAMES IN A DATA NETWORK ACCESSIBLE GAMING ENVIRONMENT

(76) Inventors: Michael W. Shore, Dallas, TX (US); Alfonso G. Chan, Colleyville, TX (US); Luis M. Ortiz, Albuquerque, NM (US); Kermit D. Lopez, Albuquerque, NM (US)

( * ) Notice: Subject to any disclaimer, the term of this patent is extended or adjusted under 35 U.S.C. 154(b) by 0 days.

(21) Appl. No.: 12/944,394

(22) Filed: Nov. 11, 2010

(65) Prior Publication Data

US 2012/0046109 A1 Feb. 23, 2012

Related U.S. Application Data

(60) Provisional application No. 61/375,499, filed on Aug. 20, 2010, provisional application No. 61/380,990, filed on Sep. 8, 2010, provisional application No. 61/411,947, filed on Nov. 10, 2010.

(51) Int. Cl.
*G06F 17/00* (2006.01)

(52) U.S. Cl.
USPC .................... 463/25; 463/28; 463/29; 463/40

(58) Field of Classification Search
USPC .......................................... 463/25, 28, 29, 40
See application file for complete search history.

(56) References Cited

U.S. PATENT DOCUMENTS

| | | | | |
|---|---|---|---|---|
| 6,527,638 | B1 | 3/2003 | Walker et al. | |
| 6,935,952 | B2 | 8/2005 | Walker et al. | |
| 7,209,733 | B2 | 4/2007 | Ortiz et al. | |
| 7,351,149 | B1 * | 4/2008 | Simon et al. | 463/42 |
| 8,057,300 | B2 * | 11/2011 | Corbo | 463/25 |
| 2006/0172803 | A1 | 8/2006 | Hardy et al. | |
| 2006/0287091 | A1 | 12/2006 | Walker et al. | |
| 2007/0060380 | A1 * | 3/2007 | McMonigle et al. | 463/42 |
| 2008/0039192 | A1 * | 2/2008 | Laut | 463/25 |

(Continued)

OTHER PUBLICATIONS

The American Heritage® Dictionary of the English Language, Fourth Edition copyright © 2000 by Houghton Mifflin Company. Updated in 2009. Published by Houghton Mifflin Company. All rights reserved.*

(Continued)

*Primary Examiner* — Michael Cuff

(74) *Attorney, Agent, or Firm* — Kermit D. Lopez; Luis M. Ortiz; Ortiz & Lopez, PLLC

(57) ABSTRACT

A method and system for micro-betting. Video of one or more portions of one or more macro-events can be displayed via a display screen associated with a remote computing device. One or more potential micro-outcomes can be identified within the event or events. Multiple and parimutuel betting options can be generated with respect to varying micro-outcomes within or part of the macro-event(s). Then, one or more micro-bets among the multiple and parimutuel betting options with respect to the micro-outcome(s) can be placed via the remote computing device in communication with a data network. The micro-bet(s) can be transmitted from the remote computing device for placement via one or more servers in communication with the data network. Additionally, data indicative of the multiple and parimutuel betting options can be displayed via the display screen of the remote computing device in association with the video of the event or events displayed via the display screen.

20 Claims, 7 Drawing Sheets

(56) References Cited

U.S. PATENT DOCUMENTS

| | | | | |
|---|---|---|---|---|
| 2008/0076572 | A1 | 3/2008 | Nguyen et al. | |
| 2008/0220854 | A1 * | 9/2008 | Midgley et al. | 463/25 |
| 2011/0065494 | A1 * | 3/2011 | Kennedy et al. | 463/25 |
| 2011/0177862 | A1 * | 7/2011 | Amaitis et al. | 463/25 |

OTHER PUBLICATIONS

"randomize". Merriam-Webster Online Dictionary. http://www.merriam-webster.com/dictionary/randomize, printed Apr. 18, 2012, 3 pages.

* cited by examiner

SYSTEMS AND METHODS FOR ENABLING REMOTE DEVICE USERS TO WAGER ON MICRO EVENTS OF GAMES IN A DATA NETWORK ACCESSIBLE GAMING ENVIRONMENT

CROSS-REFERENCE TO PROVISIONAL PATENT APPLICATIONS

This patent application claims the benefit under 35 U.S.C. §119(e) of U.S. Provisional Application Ser. No. 61/375,499 entitled, "Systems and Methods for Enabling Remote Device Users to Wager on Micro Events of Games in a Data Network Accessible Gaming Environment," which was filed on Aug. 20, 2010 and is incorporated herein by reference in its entirety. This patent application further claims the benefit under 35 U.S.C. §119(e) of U.S. Provisional Application Ser. No. 61/380,990 entitled, "Systems and Methods for Enabling Remote Device Users to Wager on Micro Events of Games in a Data Network Accessible Gaming Environment," which was filed on Sep. 8, 2010 and is incorporated herein by reference in its entirety. This patent additionally claims the benefit under 35 U.S.C. §119(e) of U.S. Provisional Application Ser. No. 61/411,947 entitled "Systems and Methods for Enabling Remote Device Users to Wager on Micro Events of Games in a Data Network Accessible Gaming Environment," which was filed on Nov. 10, 2010 and is incorporated herein by reference in its entirety.

TECHNICAL FIELD

Embodiments are generally related to sports and event betting. Embodiments are also related to online gaming. Embodiments are additionally related to systems and methods that allow users utilizing remote devices to wager on micro events of any type in a data network accessible gaming environment facilitated by one or more network servers.

BACKGROUND OF THE INVENTION

Betting on sports and other events is a multi-billion dollar business. Casinos, for example, have large sports and event betting parlors for attracting bettors. These parlors display the bets that a person may make on various sporting or types of events. Bets are placed on most major sports including professional and college football, soccer, baseball, basketball, auto racing, and ice hockey, as well as cricket and rugby. Further, bets are placed on various sports tournaments including the NCAA Men's and Women's Basketball Championships and World Cup Soccer. Also, bets may be placed on other types of events including a selection of the winner of a reality television show (e.g., the Survivor reality show), election results, weather events, when the first person lands on Mars, the winner of the next United States Presidential election, or any other type of event.

In general, gambling is the wagering, or betting, of money or something of material value (referred to as "the stakes") on an event with an uncertain outcome with the primary intent of winning additional money and/or material goods. Typically, the outcome of the wager, or bet, is evident within a short period. The term "gaming" in this context typically refers to instances in which the activity has been specifically permitted by law. The two words are not mutually exclusive, i.e., a "gaming" company offers (legal) "gambling" activities to the public. This distinction is not universally observed in the English-speaking world, however. For instance, in the UK, the regulator of gambling activities is called the Gambling Commission (not the Gaming Commission). Also, the word gaming is frequently used to describe activities that do not involve wagering, especially online. While almost any game can be played for money, and any game typically played for money can also be played just for fun, some games are generally offered in a casino setting. Gaming can also be accomplished for non-monetary prizes such as coupons, "points" that can be redeemed for merchandise or discounts, and other promotional or recreational purposes.

Fixed odds betting and parimutuel betting frequently occur at many types of sporting events and political elections. In addition, many bookmakers offer fixed odds on a number of non-sports related outcomes, for example, the direction and extent of movement of various financial indices, the winner of television competitions such as Big Brother, and election results. Interactive prediction markets also offer trading on these outcomes with "shares" of results trading on an open market. One of the most widespread forms of gambling involves betting on horse or greyhound racing. Wagering may take place through parimutuel pools, or bookmakers may take bets personally. Parimutuel wagers pay off at prices determined by support in the wagering pools, while bookmakers pay off either at the odds offered at the time of accepting the bet or at the median odds offered by track bookmakers at the time the race started. Parimutuel betting (from the French language, Pari Mutuel or mutual betting) is a betting system in which all bets of a particular type are placed together in a pool, taxes and a house "take" or "vig" are removed by the gaming sponsor or organizer, and payoff odds are calculated by sharing the pool among all winning bets. In some countries, it is known as the Tote after the totalisator, which calculates and displays bets already made.

The parimutuel system is used in gambling on horse racing, greyhound racing, jai alai, and all sporting events of relatively short duration in which participants finish in a ranked order. A modified parimutuel system is also used in some lottery games. Betting on team sports has become an important service industry in many countries. For example, millions of Britons play the football pools every week. In addition to organized sports betting, both legal and illegal, there are many side-betting games played by casual groups of spectators such as NCAA Basketball Tournament Bracket Pools, Super Bowl Squares, Fantasy Sports Leagues with monetary entry fees and winnings, and in-person spectator games like Moundball.

Arbitrage betting is a theoretically risk-free betting system in which every outcome of an event is bet upon so that a known profit will be made by the bettor upon completion of the event, regardless of the outcome. Arbitrage betting is a combination of the ancient art of arbitrage trading and gambling, which has been made possible by the large numbers of bookmakers in the marketplace, creating occasional opportunities for arbitrage.

One can also bet with another person that a statement is true or false, or that a specified event will happen (a "back bet") or will not happen (a "lay bet") within a specified time. This occurs in particular when two people have opposing but strongly held views on truth or events. Not only do the parties hope to gain from the bet, they place the bet also to demonstrate their certainty about the issue. Some means of determining the issue at stake must exist. Sometimes the amount bet remains nominal, demonstrating the outcome as one of principle rather than of financial importance.

A multiplayer video game is one within which more than one person can play in the same game environment at the same time. Unlike most other games, computer and video games are often single-player activities that pit the player against preprogrammed challenges and/or AI (artificial intelligence)-controlled opponents, which often lack the flexibility and ingenuity of regular human thinking. Multiplayer components allow players to enjoy interaction with other individuals, be it in the form of partnership, competition or rivalry, and provide them with a form of social communication that is almost always missing in single-player oriented games. In a variety of different multiplayer game types, players may individually compete against two or more human contestants, work cooperatively with a human partner(s) in order to achieve a common goal, supervise activities of other players, or engage in a game type that incorporates any possible combination of the above. Multiplayer games typically require the players to share resources of a single game system or use networking technologies that allow players to play together over greater distances.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiments to provide systems and methods that allow users of remote communication and display devices to view a gaming event and also bet on the outcome of various "micro events" occurring during the gaming event using bi-directional communications of the remote devices with a server over a data communications network.

It is another aspect of the disclosed embodiments to provide for systems and methods that allow users of remote devices to wager on micro events of a competitive entertainment event occurring in a gaming environment via access to a network server over a data network.

It is still a further aspect of the disclosed embodiments to provide for a method for microbetting including identifying a micro-outcome to an event or series of events occurring during a macro event, such as a football game, utilizing a display associated with a remote device, selecting the micro-outcome within the larger macro event utilizing a user interface associated with the remote device and placing a micro-bet on the micro-outcome within the macro-event at a server through a data network utilizing the remote device. A micro-outcome is an outcome other than the final result of the macro-event that occurs during the macro-event, but can be indisputably calculated either before or after the final result of the macro-event. An example of a micro-outcome would be the results of a play within a game with a statistically tracked outcome such as a pitch to a batter in a baseball game (strike, ball, hit by pitch, hit [single, double, triple, home run], error, fielder's choice, etc.), a batter's completed at-bat during a baseball game (hit, fly-out, ground-out, hit by pitch, error, strike out, foul, etc.) or a fielder's participation in a play (put out or error). A micro-outcome would be the subject of a micro-bet. Some micro-outcomes can be cumulative micro-outcomes such as how many interceptions a quarterback will throw in a quarter, a half, or the entire game, how many rushing yards (e.g. +/−50) a running back will achieve in a defined period or the entire game, or even whether a candidate will win particular precincts within a congressional district and by how many votes. To be a micro-outcome, the outcome must be less than the final complete outcome of the event and verifiable by an official statistic kept by a third party not participating in the betting itself.

It is yet another aspect of the disclose embodiments to provide a method for microbetting including identifying a micro-event with multiple potential micro-outcomes occurring during a sporting event utilizing a display integrated within a portable wireless handheld device, selecting the micro-event utilizing a user interface associated with the portable wireless handheld device, and placing a micro-bet on the outcome of the micro-event at a server through a data network utilizing the portable wireless handheld device.

It is also an aspect of the disclosed embodiments to provide a system for betting on micro-outcomes occurring during a macro-event and micro-outcomes of the macro-events. Such a system can include a server for brokering wagers on micro-events occurring during macro-events and at least one remote device in communication with the server requesting placement of wagers on micro-events occurring during a macro-event.

It is another aspect of the disclosed embodiments that remote devices include desktop computers, laptop computers, set-top boxes, Internet-enabled High Definition Televisions Sets (HDTVs), and portable wireless handheld devices such as Smartphones, PDAs (Personal Digital Assistants), and proprietary portable devices rented to users at a venue.

It is still another aspect of the disclosed embodiments that wagering includes the commitment or exchange of credits, coupons or electronic cash for a microbet.

It is a further aspect of the disclosed embodiments that communications between remote devices and servers brokering wagers on micro-events be secured.

It is another aspect of the disclosed embodiments that user name and passwords enable registration and secure access to gaming services provided by servers brokering wagers on micro-events.

It is also an aspect of the disclosed embodiments that user name and passwords enable registration and secure access to personal accounts and account credit balances stored on servers providing gaming services to remote devices.

It is yet another aspect of the disclosed embodiments that a server including a wagering module for brokering wagers on micro-events transmit confirmation data via the data network to the remote device that a micro-bet has been placed on a micro-event.

It is yet another aspect of the disclosed embodiments that a video display on the remote device displays video from a sports venue, player/team information and statistics, and wagering data and input fields be accessible by a remote device user.

It is an aspect of the disclosed embodiments that a video display on the remote device provide wagering data and input fields accessible by a remote device user and a user interface on the remote device enable user interaction with wagering input fields by a remote device user.

The aforementioned aspects and other objectives and advantages can now be achieved as described herein. Methods, systems and servers are disclosed for micro-betting. In an embodiment, a method for micro-betting is disclosed, which can include the steps or logical operations of, for example: providing a micro-betting system including at least one secure server enabling access by authenticated remote computing devices via a data network; authenticating a remote computing device via the at least one secure server for access to data from the at least one secure server including information associated with potential future, real life, live macro-events, the data including multiple betting options associated with the potential future, real life, live macro-events; identifying from the information at least one potential micro-outcome within the at least one potential future real life, live macro-event, the at least one potential micro-outcome comprising a potential real life, live micro-outcome from which betting options can be developed for use in monetary wagering from remote computing devices; generating multiple betting options including parimutuel betting options needed to make a betting decision with respect to the at least one potential micro-outcome within or as part of the at least one potential future real life, live macro-event, the multiple betting options displayable on a display screen associated with the remote computing device; providing information about the at least one potential future real life, live macro-event, including the betting options needed to make a betting decision, to the remote computing device for display with real-time video of a live event via the display screen associated with the remote computing device; and receiving from the remote computing device at least one micro-bet from among the multiple betting options provided to the remote computing device with respect to the at least one potential micro-outcome, wherein the at least one micro-bet comprises a real monetary bet transmitted from the remote computing device for placement at the at least one secure server while in communication with the at least one secure server over the data network.

In another embodiment, a step or logical operation can be implemented for displaying the at least one micro-bet selected from the multiple betting options via the display screen of the remote computing device in association with video of the at least one potential future real life, live macro-event displayed via the display screen. In another embodiment steps or logical operations can be provided for compiling betting data indicative of the multiple betting options; and displaying the betting data indicative of the multiple betting options via a user interface associated with the remote computing device while real-time video of a live event associated with the potential future, real life, macro-events is also being displayed.

In yet another embodiment, a step or logical operation can be provided for permitting at least one user among a plurality of users to place micro-bets with respect to the potential micro-outcome within the at least one real life, live macro-event as a monetary bet against at least one other user among the plurality of users via the remote computing device and the data network.

In still another embodiment, a step or logical operation can be implemented for permitting at least one user among a plurality of users to place the potential micro-bet with respect to the real life, live micro-outcome as a monetary bet against at least one other user among the plurality of users via the remote computing device and the secure data network in a context of a social networking environment via the secure data network.

In another embodiment, a step or logical operation can be provided for authenticating the remote computing device for access to the data for authorization to commit monetary funds as part of any micro-bets placed by the remote computing device to the at east one secure server. In other embodiment, access to the at least one secure server via the data network comprises access via, for example, the Internet, a wireless communications network, a cellular communications network, etc. In some embodiments, the remote computing device can be a portable hand held wireless device. In other embodiments, the remote computing device can be, for example, a desktop computer. In still other embodiments, the remote computing device can be a remote computer server.

In another embodiment, a step or logical operation can be provided for configuring the information for display on the display screen in association with the remote computing device, the digital screen supporting simultaneous viewing of the betting options associated with the at least one portion of potential future, real life, live macro-events and the real-time video via the display screen.

In another embodiment, a system for micro-betting can be implemented. Such a system can include, for example, at least one secure server that includes a processor, a data bus coupled to the processor, access to a data network, and a computer-usable medium embodying computer code, the computer-usable medium being coupled to the data bus. The computer program code can include instructions executable by the processor and configured for example, for: authenticating a remote computing device for access to the at least one secure server to obtain data including potential future real life, live macro-event information and multiple betting options including parimutuel betting options associated with the potential future real life, live macro-event information; identifying from the information at least one potential micro-outcome within the at least one potential future real life, live macro-event, the at least one potential micro-outcome comprising a potential real life, live outcome from which betting options can be developed for use in monetary wagering from remote computing devices; generating multiple betting options including parimutuel betting options needed to make a betting decision with respect to the at least one potential micro-outcome within or as part of the at least one potential future real life, live macro-event displayed on the display screen associated with the remote computing device; providing information about the at least one potential future real life, live macro-event, including the betting options needed to make a betting decision, to the remote computing device for display with real-time video of a live event via the display screen associated with the remote computing device; and receiving from the remote computing device at least one micro-bet from among the multiple betting options provided to the remote computing device with respect to the at least one potential micro-outcome, wherein the at least one micro-bet comprises a real monetary bet transmitted from the remote computing device for placement at the at least one secure server while the system for micro-betting is in communication with the remote computing device over the data network.

In another embodiment, such instructions can be further configured for displaying the data indicative of the multiple betting options via the display screen of the remote computing device including the real-time video. In yet another embodiment, such instructions can be further configured for compiling the data indicative of the multiple betting options; and displaying data indicative of the multiple betting options via a user interface associated with the remote computing device. In still another embodiment, such instructions can be further configured for permitting at least one user among a plurality of users to place micro-bets with respect to the real life, live micro-outcome as a bet against at least one other user among the plurality of users via authenticated remote computing devices and the secure server over the data network.

In yet another embodiment such instructions can be for further configured for permitting at least one user among a plurality of users to place the micro-bet with respect to the potential micro-outcome within the at least one real life, live macro-event as a bet against at least one other user among the plurality of users via the remote computing device and the secure server in a context of a social networking environment via the data network. In still another embodiment, such instructions can be further configured for authenticating the remote computing device for authorization to commit monetary funds as part of any micro-bets placed by the remote computing device to the micro-betting system.

In another embodiment, a secure server for supporting micro-betting as part of a online wagering system can be implemented. Such a secure server can include, for example, a processor, a data bus coupled to the processor, access to a data network, and a computer-usable medium embodying computer code, the computer-usable medium being coupled to the data bus. The computer program code can include instructions executable by the processor to, for example: authenticate a remote computing device for secure access to data from the at least one secure server including potential future real life, live macro-event information and multiple betting options including parimutuel betting options associated with the potential future real life, live macro-event information; identify from the data at least one potential micro-outcome within the at least one potential future real life, live macro-event, the at least one potential micro-outcome comprising a potential real life, live outcome from which betting options can be developed for use in monetary wagering from remote computing devices; generate multiple betting options including parimutual betting options needed to make a betting decision with respect to the at least one potential micro-outcome within or as part of the at least one potential future real life, live macro-event displayed as on the display screen associated with the remote computing device; provide information about the at least one potential future real life, live macro-event including the betting options needed to make a betting decision, to the remote computing device for display with real-time video of a live event via the display screen associated with the remote computing device; and receive from the remote computing device at least one micro-bet from among the multiple betting options provided to the remote computing device with respect to the at least one potential micro-outcome, wherein the at least one micro-bet comprises a real monetary bet transmitted from the remote computing device for placement at the at least one secure server while the system for micro-betting is in communication with the remote computing device over the data network.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
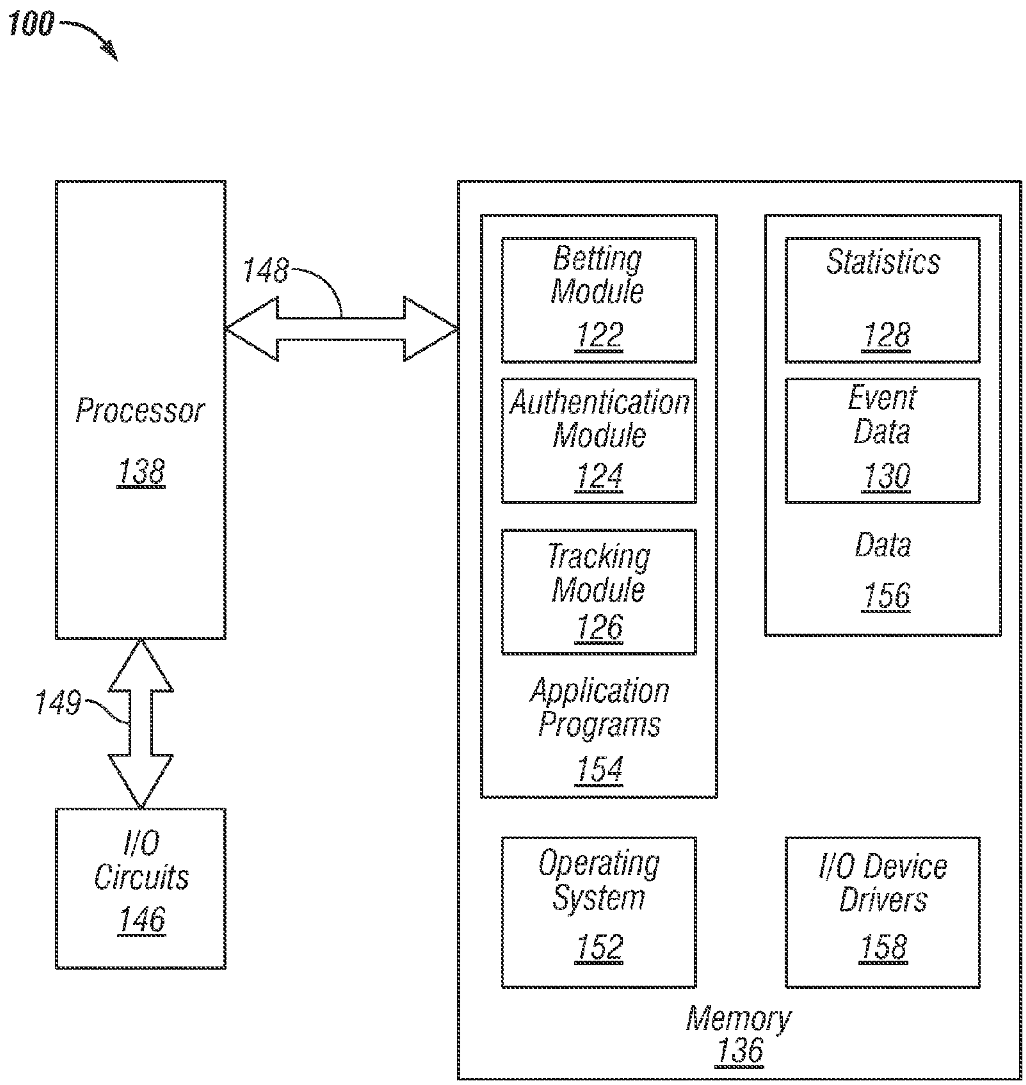
FIG. 1 illustrates a high-level block diagram of an exemplary data processing system or wagering module/database environment that may be included in devices operating in accordance with the disclosed embodiments.

The particular values and configurations discussed in these non-limiting examples can be varied and are cited merely to illustrate at least one embodiment and are not intended to limit the scope thereof.

The embodiments now will be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will be appreciated by one skilled in the art, the present invention can be embodied as a method, data processing system, or computer program product. Accordingly, the present invention may take the form of an entire hardware embodiment, an entire software embodiment, or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, etc.

Computer program code for carrying out operations of the present invention may be written in an object oriented programming language (e.g., Java, C++, etc.). The computer program code, however, for carrying out operations of the present invention may also be written in conventional procedural programming languages such as the "C" programming language or in a visually oriented programming environment such as, for example, VisualBasic.

The program code may execute entirely on the user's computer, partly on the user's computer, as a stand-alone software package, partly on the user's computer and partly on a remote computer or entirely on the remote computer. In the latter scenario, the remote computer may be connected to a user's computer through a local area network (LAN) or a wide area network (WAN), wireless data network e.g., WiFi, Wimax, 802.xx, and cellular network or the connection may be made to an external computer via most third party supported networks (for example, through the Internet using an Internet Service Provider).

The invention is described in part below with reference to flowchart illustrations and/or block diagrams of methods, systems, computer program products, and data structures according to embodiments of the invention. It will be understood that each block of the illustrations, and combinations of blocks, can be implemented by computer program instructions. These computer program instructions may be provided to a processor of a general purpose computer, special purpose computer, or other programmable data processing apparatus to produce a machine such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Referring now to FIG. 1, an exemplary data processing system 100 or wagering module/database environment that may be included in devices operating in accordance with some embodiments of the present invention will be discussed. As illustrated, the data processing system 100 includes a processor 138, a memory 136, and input/output circuits 146. The data processing system 100 may be incorporated in, for example, a personal computer, a portable wireless hand held device (e.g., Smartphone, etc), server, router or the like. The processor 138 communicates with the memory 136 via an address/data bus 148 and communicates with the input/output circuits 146 via an address/data bus 149. The input/output circuits 146 can be used to transfer information between the memory 136 and another computer system or a network using, for example, an Internet Protocol (IP) connection and/or wireless or wired communications. These components may be conventional components such as those used in many conventional data processing systems, which may be configured to operate as described herein.

In particular, the processor 138 can be any commercially available or custom microprocessor, microcontroller, digital signal processor, or the like. The memory 136 may include any memory device containing the software and data used to implement the functionality circuits or modules used in accordance with embodiments of the present invention. The memory 136 can include, but is not limited to, the following types of devices: cache, ROM, PROM, EPROM, EEPROM, flash memory, SRAM, DRAM, and magnetic disk. In some embodiments of the present invention, the memory 136 may be, for example, a content addressable memory (CAM).

As further illustrated in FIG. 1, the memory 136 may include several categories of software and data used in the data processing system 100: an operating system 152, application programs 154, input/output device drivers 158, and data 156. As will be appreciated by those skilled in the art, the operating system 152 may be any operating system suitable for use with a data processing system such as, for example, Linux, Windows XP, Mac OS, Unix, etc. The input/output device drivers 158 typically include software routines accessed through the operating system 152 by the application programs 154 to communicate with devices such as the input/output circuits 146 and certain memory 136 components. The application programs 154 are illustrative of the programs that implement the various features of the circuits and modules according to some embodiments of the present invention. Finally, the data 156 represents static and dynamic data that can be used by the application programs 154, the operating system 152, the input/output device drivers 158, and other software programs that may reside in the memory 136. As illustrated in FIG. 1, the data 156 may include, for example, statistics 128 and event information 130 for use by the circuits and modules of the application programs 154 according to some embodiments of the present invention as discussed further herein. The event information 130, for example, may include data associated with a particular event. Statistics 128 may include, for example, not only statistical information related to a particular event, but also broader statistics such as, for example, team history and sports scores.

In the embodiment shown in FIG. 1, applications programs 154 can include, for example, a wagering or betting module 122, a security or authentication module 124, a tracking module 126, and so forth. While the present invention is illustrated with reference to the betting module 122, the authentication module 124, and the tracking module 126 being application programs in FIG. 1, as will be appreciated by those skilled in the art, other configurations fall within the scope of the present invention. For example, rather than being application programs 154, these modules may also be incorporated into the operating system 152 or other such logical division of the data processing system 100.

Furthermore, while betting module 122, the authentication module 124, and the tracking module 126 are illustrated in a single data processing system, as will be appreciated by those skilled in the art, such functionality may be distributed across one or more data processing systems. Thus, the present invention should not be construed as limited to the configuration illustrated in FIG. 1, but may be provided by other arrangements and/or divisions of functions between data processing systems. For example, although FIG. 1 is illustrated as having various circuits/modules, one or more of these circuits may be combined without departing from the scope of the present invention.

Note that as utilized herein the term "module" generally refers to a collection or routines (and/or subroutines) and/or data structures that performs a particular task or implements a particular abstract data type. Modules usually include two parts: an interface, which lists the constants, data types, variables, and routines that can be accessed by other modules or routines, and an implementation, which is typically, but not always, private (accessible only to the module) and which contains the source code that actually implements the routines in the module. The term "module" may also refer to a self-contained component that can provide a complete function to a system and can be interchanged with other modules that perform similar functions.

Figure 2:
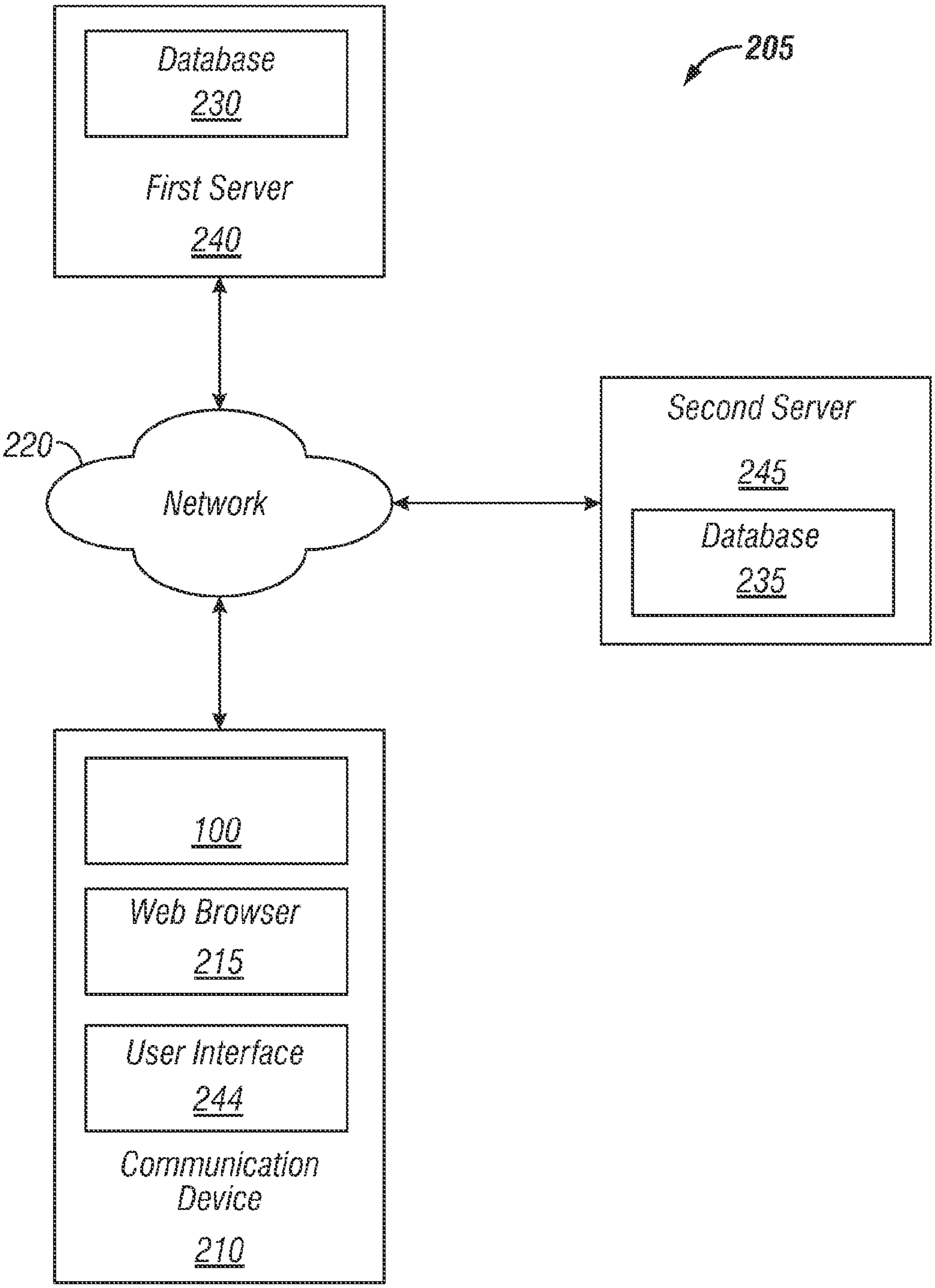
FIG. 2 illustrates an exemplary environment for operations and devices in accordance with the disclosed embodiments.

Referring now to FIG. 2, an exemplary environment 205 for operations and devices according to some embodiments of the present invention will be discussed. As illustrated in FIG. 2, the environment 205 may include a communications/computing device 210, a data communications network 220, a first server 240, and a second server 245. It can be appreciated that additional servers may be utilized with respect to network 220. It can also be appreciated that in some embodiments, only a single server such as server 240 may be required. In general, the communications device 210 allows a user of the communications device 210 to view a macro-event and also bet on the micro-outcomes of various micro events (both discreet and cumulative) occurring during and within the macro-event utilizing bi-directional communications of the remote device 210 with one or more servers 240, 245, etc. over the data communications network 220.

As illustrated, the communications device 210 illustrated in FIG. 2 may include the wagering module or system 100 according to some embodiments of the present invention discussed above with respect to FIG. 1. For example, the application programs 154 discussed with respect to FIG. 1 could be included as part of the wagering system module 100 of the communications device 210. The communications device 210 may be, for example, a laptop computer, a desktop computer, a personal data assistant (PDA), Smartphone, a web capable mobile terminal or any device capable of communicating with the network 220.

The communications device 210 may include, for example, a user interface 244, which may be used to enter wagers according to some embodiments of the present invention, and a web browser 215 that may be accessed through the user interface 244, according to some embodiments of the present invention. As discussed above, the wagering system module 100 may be configured to permit a user to place bets via the communications device 210. The first server 240 may include a database 230 and the second server 245 may include a database 235. The communications device 210 may communicate over the network 220, for example, the Internet through a wireless communications link, an Ethernet connection, a telephone line, a digital subscriber link (DSL), a broadband cable link, other wireless links, etc. The first and second servers 240 and 245 may also communicate over the network 220. Thus, the network 220 may convey data between the communications device 210 and the first and second servers 240 and 245. The network 220 can be, for example, a wireless communications network such as, for example, a cellular communications network or 802.11/WiFi network. The network 220 can also be a client-server network.

The remote computing device 210 can be, for example, a desktop computer, a laptop computer, a set-top box, or portable wireless handheld devices such as a Smartphone and/or PDA. The remote computing device 210 can also be, for example, a device such as an iPad type computing device.

Figure 3:
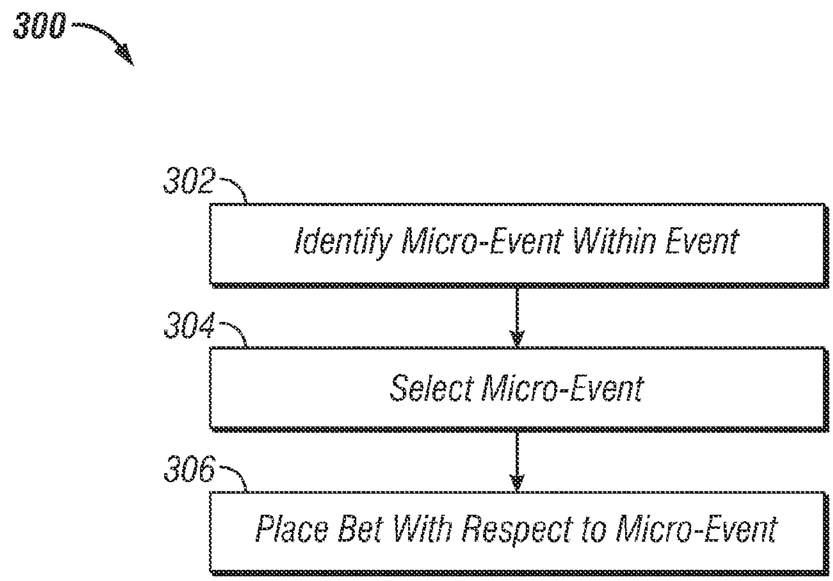
FIG. 3 illustrates a high-level flow chart of operations depicting logical operational steps of a method for enabling one or more remote device users to wager on games in a data network access to a gaming environment, in accordance with the disclosed embodiments.

FIG. 3 illustrates a high-level flow chart of operations depicting logical operational steps of a method 300 for enabling one or more remote device users to wager on games in a data network access to a gaming environment, in accordance with the disclosed embodiments. As indicated at block 302, an operation can be implemented to identify a micro-event within an event utilizing a remote computing device such as, for example, the remote computing/communications device 210 depicted in FIG. 2. Once the micro-event has been identified, then the micro-event (e.g., a player swinging a bat in the context of a particular inning of a baseball game) can be selected utilizing such a remote computing device, as described at block 304. Thereafter, as illustrated at block 306, a micro-bet (i.e., a wager, bet, etc) can be placed with respect to the micro event through a network, such as network 220, utilizing the remote computing device 210. Data indicative of the micro-bet is transmitted from the remote computing device 210 for placement of the micro-bet via one or more servers (e.g., server 240, 235, etc) in communication with the network 220.

In general, the method 300 depicted in FIG. 3 allows a user of the remote computing device 210 to wager on one or more micro-outcomes (discreet and cumulative) that result from the conduct of a macro-event via access to network servers 240 and/or 245, etc over the data network 220.

Figure 4:
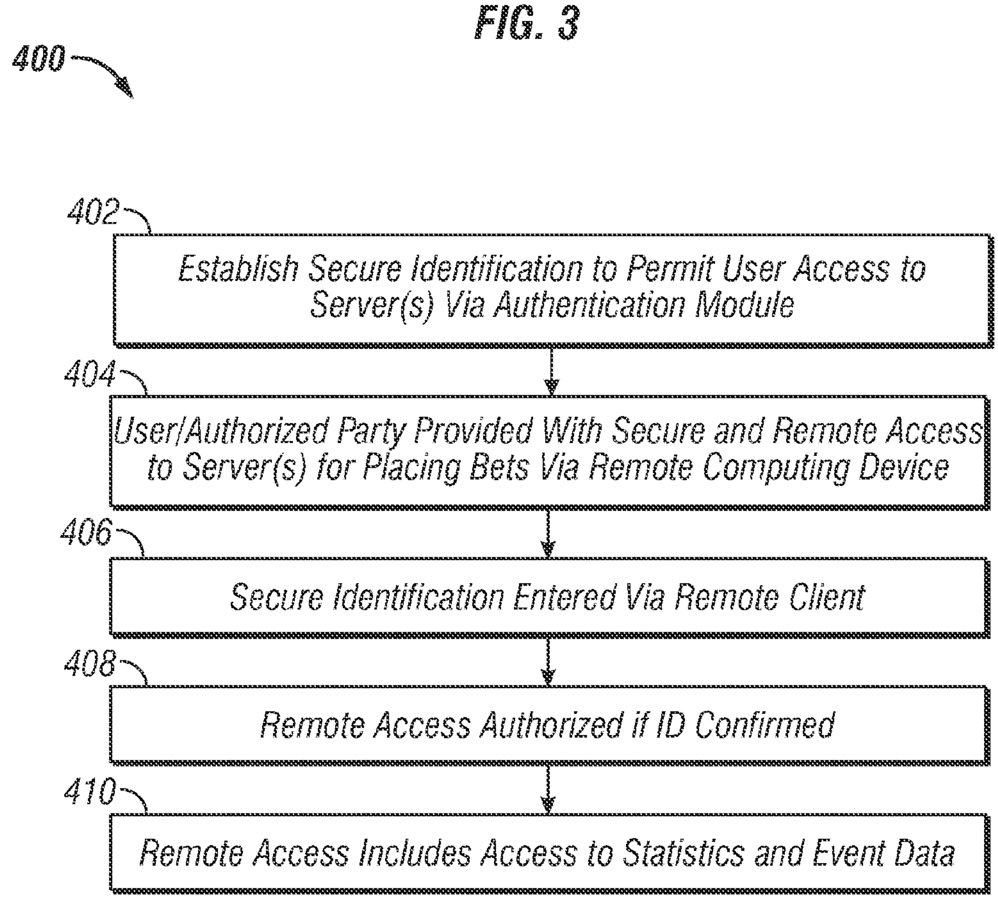
FIG. 4 illustrates a high-level flow chart of operations depicting a method for authentication of a user of a remote computing device, in accordance with the disclosed embodiments.

FIG. 4 illustrates a high-level flow chart of operations depicting a method 400 for authentication of a user of a remote computing device, in accordance with the disclosed embodiments. As illustrated at block 402, a secure identification can be established to permit a user of the remote computing device 210 access to one or more of the servers 240, 245, etc. through the network 220 via the authentication module 124. Next, as depicted at block 404, the user/authorized party is provided with secure and remote access to one or more of the servers 240, 245, etc. for placing bets via the remote computing device 210. The user of the remote computing device 210 can then actually enter his or her secure identification via the remote computing device 210 as described at block 406. Remote access can then be granted to the user if his or her identification information is confirmed as depicted at block 408. Remote access to one or more of the servers 240, 245, etc. via the network 220 includes, for example, access to statistics and event data, as indicated at block 410. Such information can be utilized by the user in consideration for placing his or her micro-bet with respect to a micro-event via the remote computing device 210.

Note that although bets/wagers can be placed by remote device users on the outcome of a macro-event anytime before or during, but before the conclusion of, a macro-event, the user(s) are not able to bet on micro-events outcomes or cumulative micro-outcomes occurring during and within the macro-event. The disclosed embodiments thus provide systems and methods for enabling of microbetting. Micro-events with micro-outcomes can occur several or more times, for example, during an overall sporting macro-event or game, or be calculated at the conclusion of segments of the macro event (e.g. quarters, halves, etc.) or the entire macro event. For example, each swing of a baseball bat by a baseball player in a professional baseball game is a micro-event that can itself be a part of, or contribute to, a micro-outcome. The micro-outcome in such a case is the result of the pitch or the overall at bat. A wager can be whether the pitch is a strike, a ball or a walk. This might be the smallest possible micro-outcome at that moment in the macro-event.

Another type of micro-outcome that is larger than the outcome of a single pitch within the macro-event baseball game would be whether the player currently at bat, for example, walks, strikes out, is hit by a pitch, flies out, grounds out, hits a single, double, triple, home run or inside the park home run, reaches on a fielder's choice, or reaches on an error. A micro-outcome bet could even be placed that not only will the batter ground out, but that he will ground out to a particular fielder. Utilizing the approach described herein, micro-bets in baseball can be placed, for example, on cumulative micro-events such as how many errors a team will commit in a game, how many hits the team will have, how many pitchers they will use, etc. The only limitation would be that the micro-bet would have to be verifiable by reference to the macro-event's official statistics so that the dispute of a micro-outcome would have a neutral reference point. In an election macro-event, for example, the micro-outcomes eligible for micro-bets might be on the winner in an individual precinct, state or other counted and reported area, the margin of victory, etc. Odds can be assigned to each of these potential outcomes either on a parimutuel or some other basis like historical averages. Bets placed on a micro-event can be against the house or can be against other players participating in a social microgaming environment hosted by a server. The following non-limiting scenarios provide examples of micro-events. A number of scenarios are possible and any macro-event or series of events with official statistics tracking micro-outcomes within the macro-event are eligible for this system of gaming.

In one scenario, for example, Person X watches a football game in real time utilizing a remote computing device 210 and places a bet that the quarterback on football Team A will throw (micro-outcome) on the next play. The odds are given on the display based on pari-mutuel calculations based upon the micro-betting positions of other similarly situated users. The displayed odds are 3/2. Person X bets $1 and the quarterback does not attempt a pass. Person X's account is debited $1 and the balance in his account remains available to place another micro-bet on any micro-event or micro-outcome that may follow. Person X then places a micro-bet that on the next play Team A will suffer an interception. Because of the micro-betting positions of other users, the odds of this outcome are displayed as 150/1. These actions continue throughout the game until the end of the macro-event (game) or Person X's account is empty of available betting funds. Micro-betting allows Person X to take positions counter to prior bets (betting a quarterback will throw 2 touchdown passes in one cumulative micro-bet and in another micro-betting he throws none), bet repeatedly on discreet micro-events' outcomes within the game and continuously "play" the macro-event with the participants through micro-betting both in real time or on micro-outcomes tracked by official statistics (e.g. how many catches a receiver will have in a game, how many penalties a team will suffer, how many rushing yards a back will gain, etc.). This level of participation means the player does not have to wait for long periods to track his/her progress in the event.

In another scenario, for example, Person Y places a bet utilizing remote computing device 210 on a particular player during a baseball game. For example, Person Y places a bet that a batter from Team A hits a home run during the game, a cumulative micro-bet. However, Person Y notices that the batter from Team B is playing well. Person Y is allowed to also place a bet on a batter from Team B since it has become obvious that during the game that particular batter is playing well and may score a home run. As long as the game is continuing and the odds are being updated, the micro-bets remain available. Another bet during a baseball game would be if Person Y places a bet on how many runs will be scored before each particular inning, or even in each inning. During the game Person Y is able to place multiple bets that do not rely on the overall score of the game but components of the game such as a player's performance (e.g. hits, runs, RBI, errors, etc.).

In yet another scenario, for example, during a basketball game Person X places a bet via the remote computing device 210 on the amount of points a particular player will score, a cumulative micro-bet. As the game progresses, Person X can place bets on other players. In addition to a player's performance, Person X can place a bet on the score of the game or developments in the game in general (whether a coach will receive a technical foul).

In still another scenario, for example, during a game of golf, Person Y places a bet on Golfer A who is predicted to win the tournament. However, on the very first hole Golfer A hits a triple bogey, as a result Person Y decides to place a micro-bet that Golfer A will hit a shot out of bounds or that Golfer A will miss a 5' putt.

Throughout the particular game in which bets are being placed, micro-betting via the remote computing device 210 allows the gambler to feel as if they're "in the game" and even after losing early bets can win their money back by placing different subsequent bets.

Figure 5:
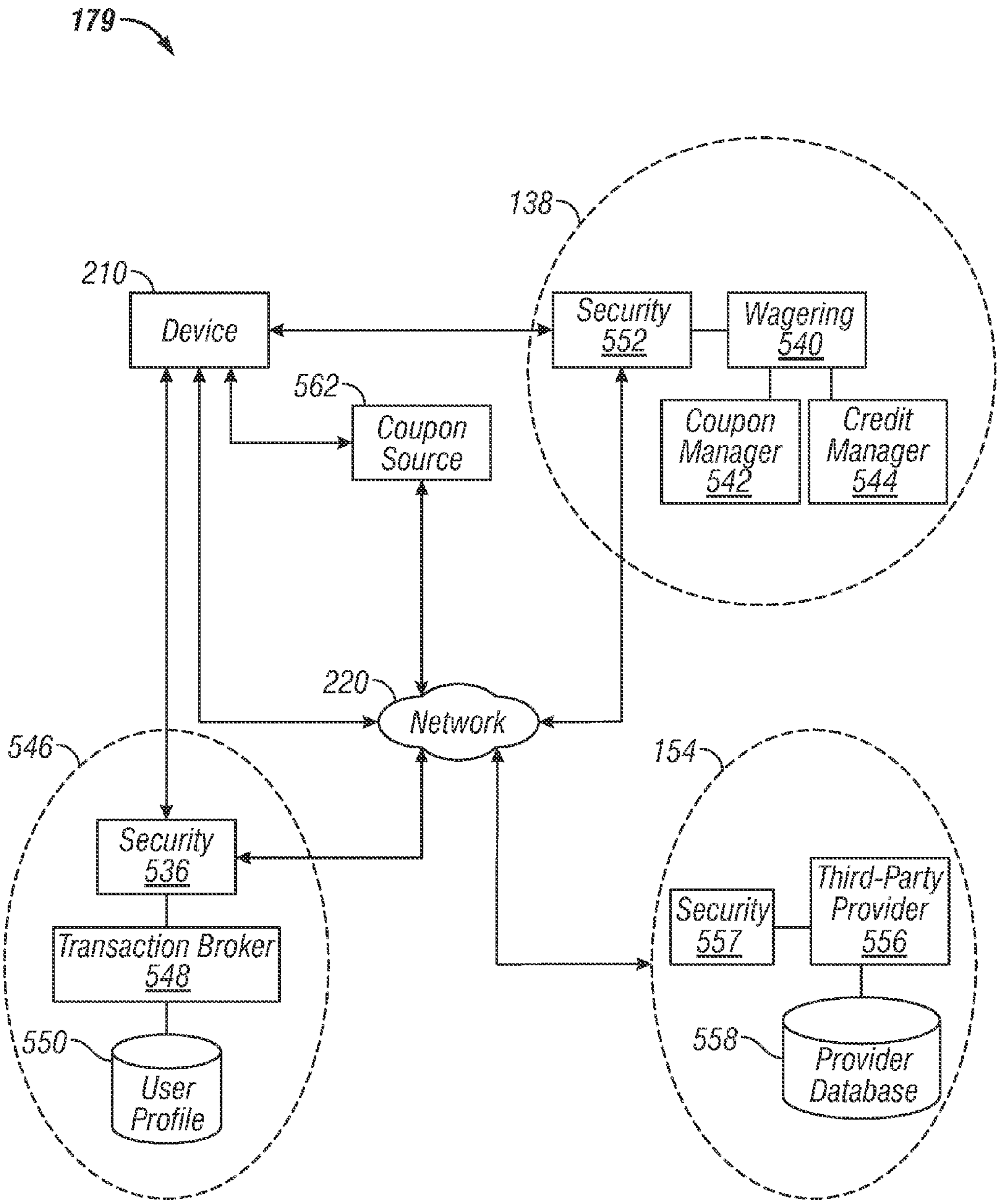
FIG. 5 illustrates a block diagram of a wagering system that includes the commitments or exchange of credits, coupons or electronic cash for a microbet, in accordance with the disclosed embodiments.

FIG. 5 illustrates a block diagram of a wagering system 500 that includes the commitments or exchange of credits, coupons or electronic cash for a microbet, in accordance with the disclosed embodiments. As indicated in FIG. 5, the remote computing device 500 can communicate with network 220, which can also communicate with a coupon source 562. Thus, the computing device 210 can retrieve and store electronic coupons for use in wagering and placing micro-bets as disclosed herein. Note that the coupon source 562 can be configured as a web site from which coupon and credit data may be retrieved. Such a web site can be associated with a transaction broker 548 and/or a third-party provider 556 and/or a wagering manager 540. Note that the wagering manager 540 may be associated with or include the use of a coupon manager 542 and a credit manager 544. A security module 552 permits access and/or communications to the wagering manager 540. Similarly, a security module 557 permits access and/or communications with the third-party provider 556, which in turn can communicate with a provider database 558. A security module 536 can communicate with a transaction broker 548 that in turn includes or is associated with a user profile database 550.

Figure 6:
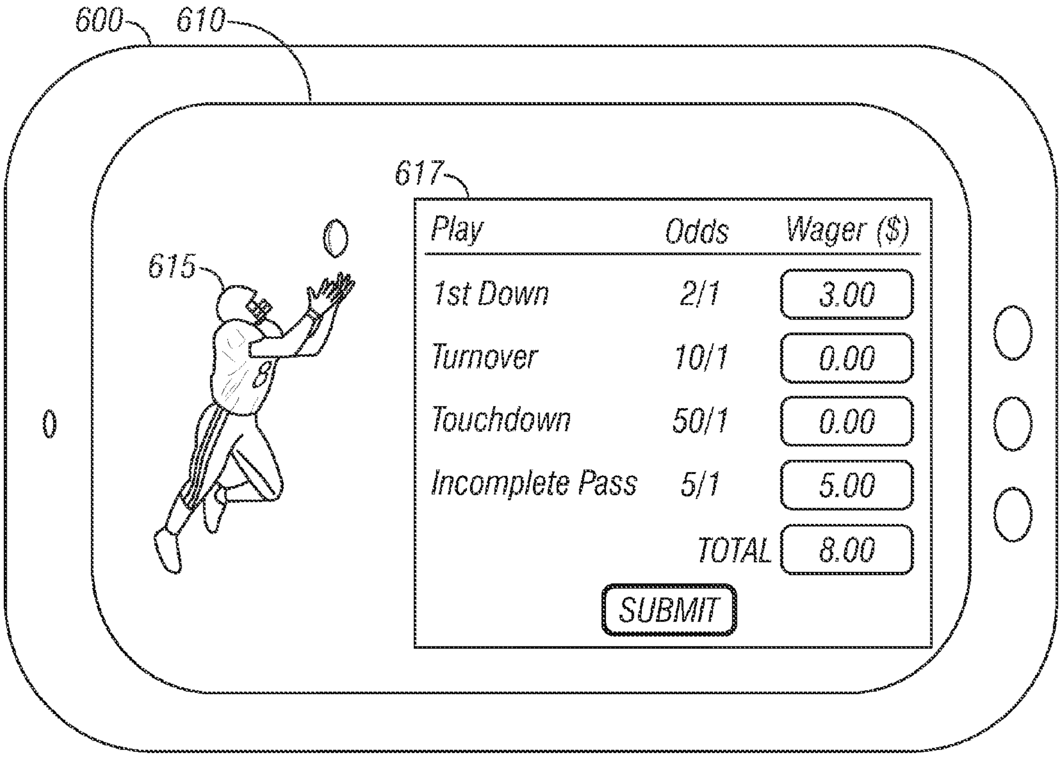
FIG. 6 illustrates a display showing both game video and wagering data, in accordance with the disclosed embodiments.

Referring to FIG. 6, a video display screen 610 is shown integrated within a remote device 600. Ideally, the video display screen 610 can support the viewing of a macro-event activity 615 as well as micro event gaming data 617 on the video display screen 610. The video display screen 610 can also be touch-sensitive to provide a touch screen interface for users to place bets when the remote device is a handheld device. With large screens associated with remote devices 600, macro-event video can be shown simultaneously with micro-bet wagering data such as tallies, histories, and pending micro-bets. As an example, a picture-in-picture display can enable simultaneous viewing of disparate data (macro-event video and wagering data).

It is an aspect of the disclosed invention that a video display on the remote device provide wagering data and input fields accessible by a remote device user and a user interface on the remote device enable user interaction with wagering input fields by a remote device user.

Figure 7:
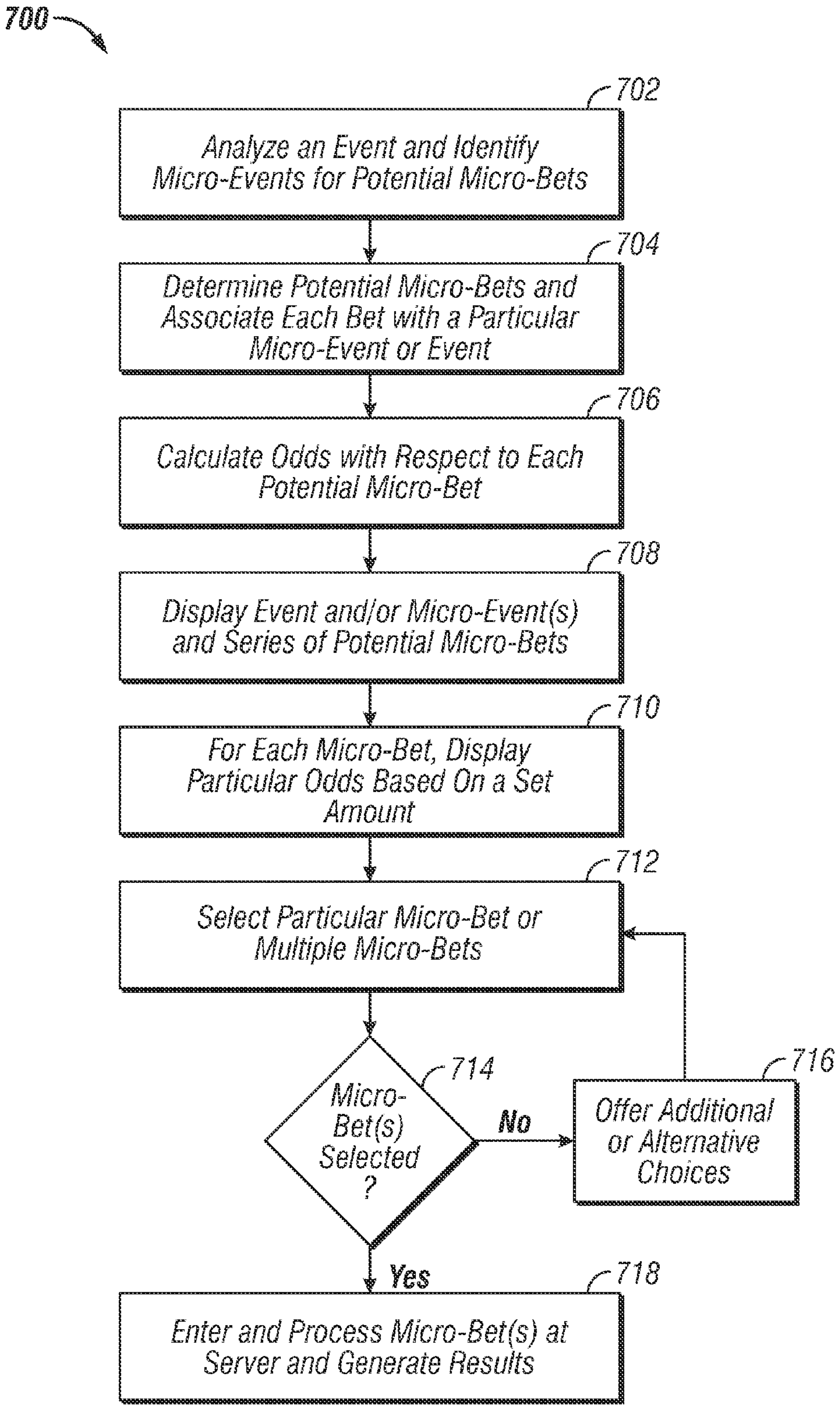
FIG. 7 illustrates a high-level flow chart of operations depicting a method for wagering, in accordance with the disclosed embodiments.

FIG. 7 illustrates a high-level flow chart of operations depicting a method 700 for wagering, in accordance with the disclosed embodiments. As illustrated at block 702, an operation can be implemented in which a macro-event, such as a sporting event, is analyzed and micro-events within the macro-event analyzed for potential micro-bets. Note that a micro-event can be an event as "small" as, for example, the next pitch in a baseball game (i.e., the macro-event) is a strike or a ball (i.e. the micro-outcome), the player in a basketball game (i.e. the macro-event) makes a free throw (i.e. the micro-outcome), the next play in a football game (i.e. the macro-event) is a pass or run (i.e. the micro-outcome), or an individual participant reaches certain cumulative micro-outcomes (e.g. yards gained, passes completed, hits, points etc.) in a set period during or at the end of the entire macro-event (e.g. baseball game, football game, etc).

Following processing of the operation depicted at block 704, potential micro-bets (e.g., an individual bet or a group of bets on one or more micro-outcomes) can be determined and each micro-bet associated with a particular micro-outcome within the macro-event or with, for example, the cumulative performance of one or more participants in the macro-event (or segments of the macro-event). Thereafter, as described at block 706, the odds can be calculated with respect to each of the potential micro-bets determined (i.e., from block 704). Next, as depicted at block 708, the micro-outcome and/or the micro-event(s) can be displayed (e.g., a live video feed, video replay, etc) via a display such as, for example, the video display screen 610 shown in FIG. 6, the user interface 244, etc. As indicated at block 708, the micro-bets (e.g., a series of potential micro-bets) can also be displayed via such a display and in association with such video of the macro-event and/or including the particular micro-events (discreet and/or cumulative) associated with respective micro-bets. Additionally, as illustrated at block 710, for each micro-bet, particular odds based on a set amount can be displayed via a display such as the display screen 610, the user interface 244, etc. Next, as indicated at block 712, a particular micro-bet and/or multiple micro-bets can be selected via, for example, a user interface such as, for example, the user interface 244.

Thereafter, as depicted at block 714 a test can be processed to determine if a selection of a micro-bet or a group of micro-bets has been made. If so, then as indicated at block 718, the micro-bet(s) can be automatically entered and processed via, for example, a server (e.g., server 240, server 245, etc.), and results then generated. If it is determined, however, that a selection has not been made, then as indicated at block 716, additional or alternative choices (e.g., other/new micro-bets associated with particular micro-outcomes) can be offered for selection.

Based on the foregoing, it is clear that a micro-outcome can result using discreet verifiable actions as small as whether the next pitch in a baseball game is a strike or ball, the player in a basketball game makes the free throw, the next play in a football game is a pass or run, the next play in a football game gains more or less than 5 yards, results in a fumble, interception or penalty, etc. Also, the user can be presented with a display via display screen of multiple choices of micro-bets, each of which displays the odds if he or she wins. For example, in a football game macro-event, the display screen 610 can display the game (e.g., video) and above that video a series of potential micro-bets (e.g., pass, run, turnover, touchdown, gain 10+, gain less than 5, lose yards, sack, etc.). For each potential micro-bet, the user will see his or her odds if the user bets $1 or some other set amount. For instance, it might be 15 to 1 that an interception will be thrown, but 1 to 1 if it will be a running play. The user can "click" (i.e., select) the micro-bet or multiple micro-bets he or she desires, and as long as this bet is entered in the server (e.g., server 240, server 245, etc.) before the play is displayed, the user is "in the action" so to speak. If the player does not like any of those bets, he or she can click or hit a graphically displayed button displayed via the display screen and be given additional choices. The priority of available micro-bets can be established in several ways, including prioritizing based on the popularity of the bets with the current participants, the lowest or highest odds prioritized, the participants history or customized to the participants preferences.

The disclosed embodiments thus relate to methods and systems for providing micro-bet options for each micro-event and a running tally thereof. For example, each play in a game provides an opportunity for a new set of micro-betting choices. The disclosed embodiments are thus not focused on the concept of the user betting prior to the macro-event that a particular player will achieve some result (e.g. hit a home run during the game), but rather allows a user at any time during the game and prior to the micro-outcome that the micro-outcome will occur. In addition, the user can place a micro-bet that the batter currently up to the plate will hit a home run or a triple or a double or a single or walk or get hit by a pitch or fly out or ground out. These real time micro-bets are available with real time parimutuel odds, as an at bat is a micro-event that will result in a micro-outcome that is objectively verifiable by reference to statistics kept by a neutral third party. The user literally can place, for example, hundreds of verifiable bets on micro-outcomes during a macro-event via such an approach.

There are already bets that can be placed before an event starts on game scores, scores after quarters, halftime scores, scores after a certain number of innings, etc. There are already bets available on whether, for example, a particular baseball player will hit a home run in a game. There are no bets available, however, where even after a macro-event starts a particular baseball player will hit a home run, much less a system where a bet can be placed in real time on whether a certain micro-outcome will occur during a specific at bat, or even a particular pitch. This is a key difference between the disclosed embodiments and prior art implementations. The disclosed embodiments thus provide for a "bet/play as you watch, dynamic, parimutuel game" where each possible situation, or micro-event in a larger game, enables multiple betting options on micro-event outcomes even after the macro-event starts. Such an approach is outlined herein with respect to FIG. 8.

Figure 8:
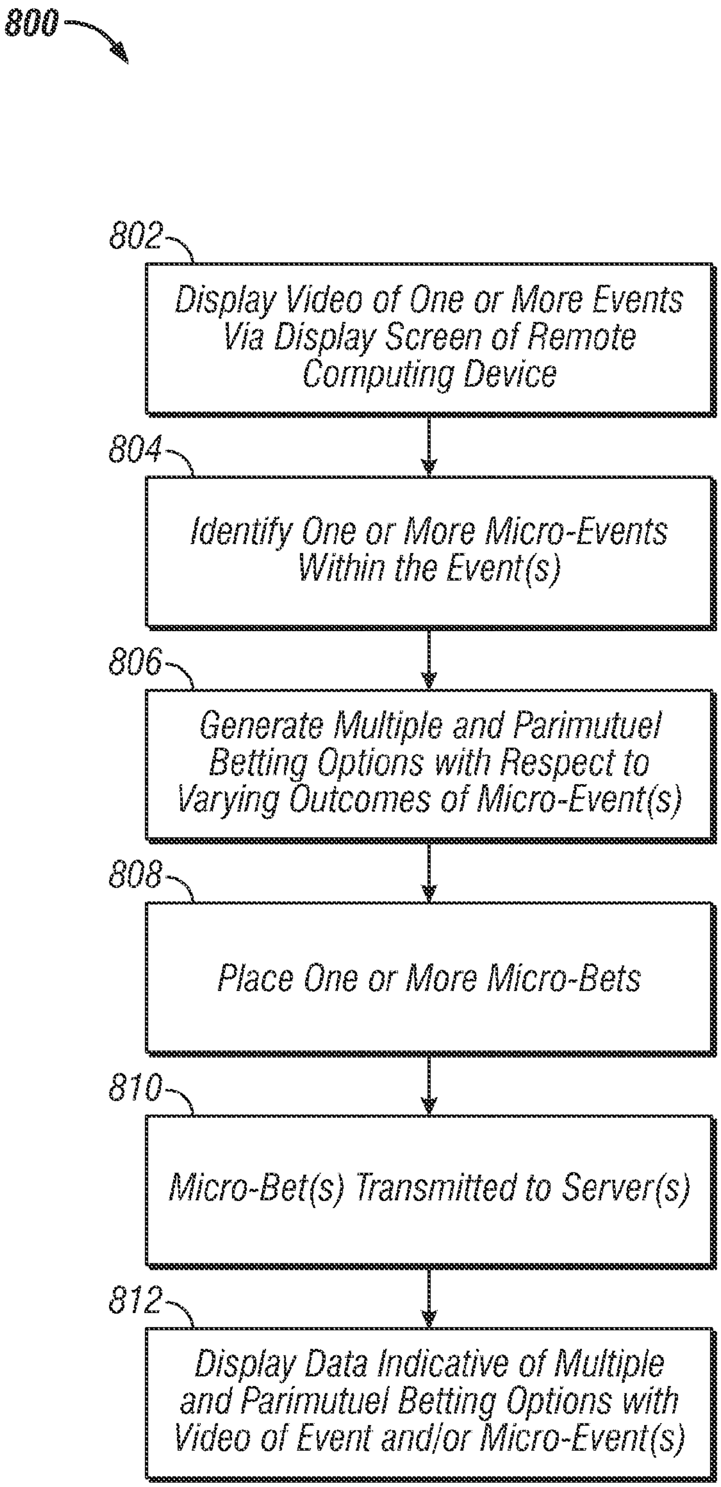
FIG. 8 illustrates a high-level flow chart of operations depicting a method for placing a micro-bet with respect to multiple and parimutuel betting options, in accordance with the disclosed embodiments.

FIG. 8 illustrates a high-level flow chart of operations depicting a method 800 for placing a micro-bet with respect to multiple and parimutuel betting options, in accordance with the disclosed embodiments. The operations indicated in FIG. 8 thus related to a method 800 for micro-betting. As illustrated at block 802, an operation can be implemented for displaying video of one or more macro-events via a display screen associated with and/or integrated with a remote computing device such as, for example, the remote computing device 210 discussed earlier herein.

Thereafter, as indicated at block 804, an operation can be implemented for identifying one or more micro-events within the macro-event or macro-events displayed via a display screen of, for example, the remote computing device 210. Next, as depicted at block 806, an operation can be implemented for generating multiple and parimutuel betting options with respect to varying micro-outcomes within the identified macro-event or macro-events. Thereafter, as described at block 808, an operation can be implemented for placing via the remote computing device one or more micro-bets among the multiple and parimutuel betting options with respect to the micro-outcomes (discreet and cumulative) via a data network in communication with the remote computing device.

Then, as depicted at block 810, the micro-bet or micro-bets can be transmitted from the remote computing device for placement via one or more servers (e.g., servers 240, 245, etc) in communication with the network. Thereafter, as illustrated at block 812, an operation can be implemented for displaying the data indicative of the multiple and parimutuel betting options via the display screen of the remote computing device in association with the video of the macro-event or macro-events displayed via the display screen.

It will be understood that the circuits and other means supported by each block and combinations of blocks can be implemented by special purpose hardware, software or firmware operating on special or general-purpose data processors, or combinations thereof. It should also be noted that, in some alternative implementations, the operations noted in the blocks may occur out of the order noted in the figures. For example, two blocks shown in succession may, in fact, be executed substantially concurrently, or the blocks may sometimes be executed in the reverse order.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for micro-betting, comprising:

providing a micro-betting system including at least one secure server enabling access by authenticated remote computing devices via a data network;

authenticating a remote computing device via said at least one secure server for access to data from said at least one secure server including information associated with potential future, real life, live macro-events, said data including multiple betting options associated with said potential future, real life, live macro-events;

identifying from said information at least one potential micro-outcome within said at least one potential future real life, live macro-event, said at least one potential micro-outcome comprising a potential real life, live micro-outcome from which betting options can be developed for use in monetary wagering from remote computing devices;

generating multiple betting options including parimutuel betting options needed to make a betting decision with respect to said at least one potential micro-outcome within or as part of said at least one potential future real life, live macro-event, said multiple betting options displayable on a display screen associated with said remote computing device;

providing information about said at least one potential future real life, live macro-event, including said betting options needed to make a betting decision, to said remote computing device for display with real-time video of a live event via said display screen associated with said remote computing device; and receiving from said remote computing device at least one micro-bet from among said multiple betting options provided to said remote computing device with respect to said at least one potential micro-outcome, wherein said at least one micro-bet comprises a real monetary bet transmitted from said remote computing device for placement at said at least one secure server while in communication with said at least one secure server over said data network.

2. The method of claim 1 further comprising displaying said at least one micro-bet selected from said multiple betting options via said display screen of said remote computing device in association with video of said at least one potential future real life, live macro-event displayed via said display screen.

3. The method of claim 1, further comprising:

compiling betting data indicative of said multiple betting options; and displaying said betting data indicative of said multiple betting options via a user interface associated with said remote computing device while real-time video of a live event associated with said potential future, real life, live macro-events is also being displayed.

4. The method of claim 1 further comprising:

permitting at least one user among a plurality of users to place micro-bets with respect to said potential micro-outcome within said at least one real life, live macro-event as a monetary bet against at least one other user among said plurality of users via said remote computing device and said data network.

5. The method of claim 4 further comprising:

permitting at least one user among a plurality of users to place said potential micro-bet with respect to said real life, live micro-outcome as a monetary bet against at least one other user among said plurality of users via said remote computing device and said secure data network in a context of a social networking environment via said secure data network.

6. The method of claim 1 further comprising authenticating said remote computing device for access to said data for authorization to commit monetary funds as part of any micro-bets placed by said remote computing device to said at least one secure server.

7. The method of claim 1 wherein access to said at least one secure server via said data network comprises access via the Internet.

8. The method of claim 1 wherein access to said at least one secure server via said data network comprises access via a wireless communications network.

9. The method of claim 1 wherein access to said at least one secure server via said data network comprises access via a cellular communications network.

10. The method of claim 1 wherein said remote computing device comprises a portable hand held wireless device.

11. The method of claim 1 wherein said remote computing device comprises a desktop computer.

12. The method of claim 1 wherein said remote computing device comprises a remote computer server.

13. The method of claim 1 further comprising:

configuring said information for display on said display screen in association with said remote computing device, said display screen supporting simultaneous viewing of said betting options associated with said at least one portion of potential future, real life, live macro-events and said real-time video via said display screen.

14. A system for micro-betting, said system comprising at least one secure server including:

a processor;

a data bus coupled to said processor;

access to a data network; and a computer-usable medium embodying computer code, said computer-usable medium being coupled to said data bus, said computer program code comprising instructions executable by said processor and configured for:

authenticating a remote computing device for access to said at least one secure server to obtain data including potential future real life, live macro-event information and multiple betting options including parimutuel betting options associated with the potential future real life, live macro-event information;

identifying from said information at least one potential micro-outcome within said at least one potential future real life, live macro-event, said at least one potential micro-outcome comprising a potential real life, live outcome from which betting options can be developed for use in monetary wagering from remote computing devices;

generating multiple betting options including parimutuel betting options needed to make a betting decision with respect to said at least one potential micro-outcome within or as part of said at least one potential future real life, live macro-event displayed on said display screen associated with said remote computing device;

providing information about said at least one potential future real life, live macro-event, including said betting options needed to make a betting decision, to said remote computing device for display with real-time video of a live event via said display screen associated with said remote computing device; and receiving from said remote computing device at least one micro-bet from among said multiple betting options provided to said remote computing device with respect to said at least one potential micro-outcome, wherein said at least one micro-bet comprises a real monetary bet transmitted from said remote computing device for placement at said at least one secure server while the system for micro-betting is in communication with said remote computing device over said data network.

15. The system of claim 14 wherein said instructions are further configured for displaying said data indicative of said multiple betting options via said display screen of said remote computing device including said real-time video.

16. The system of claim 15 wherein said instructions are further configured for:

compiling said data indicative of said multiple betting options; and displaying data indicative of said multiple betting options via a user interface associated with said remote computing device.

17. The system of claim 14 wherein said instructions are further configured for:

permitting at least one user among a plurality of users to place micro-bets with respect to said real life, live micro-outcome as a bet against at least one other user among said plurality of users via authenticated remote computing devices and said secure server over said data network.

18. The system of claim 17 wherein said instructions are further configured for:

permitting at least one user among a plurality of users to place said micro-bet with respect to said potential micro-outcome within said at least one real life, live macro-event as a bet against at least one other user among said plurality of users via said remote computing device and said secure server in a context of a social networking environment via said data network.

19. The system of claim 14 wherein said instructions are further configured for authenticating said remote computing device for authorization to commit monetary funds as part of any micro-bets placed by said remote computing device to the micro-betting system.

20. A secure server for supporting micro-betting as part of a online wagering system, comprising:

a processor;

a data bus coupled to said processor;

access to a data network; and a computer-usable medium embodying computer code, said computer-usable medium being coupled to said data bus, said computer program code comprising instructions executable by said processor to:

authenticate a remote computing device for secure access to data from said at least one secure server including potential future real life, live macro-event information and multiple betting options including parimutuel betting options associated with said potential future real life, live macro-event information;

identify from said data at least one potential micro-outcome within said at least one potential future real life, live macro-event, said at least one potential micro-outcome comprising a potential real life, live outcome from which betting options can be developed for use in monetary wagering from remote computing devices;

generate multiple betting options including parimutual betting options needed to make a betting decision with respect to said at least one potential micro-outcome within or as part of said at least one potential future real life, live macro-event displayed as on said display screen associated with said remote computing device;

provide information about said at least one potential future real life, live macro-event, including said betting options needed to make a betting decision, to said remote computing device for display with real-time video of a live event via said display screen associated with said remote computing device; and receive from said remote computing device at least one micro-bet from among said multiple betting options provided to said remote computing device with respect to said at least one potential micro-outcome, wherein said at least one micro-bet comprises a real monetary bet transmitted from said remote computing device for placement at said at least one secure server while the system for micro-betting is in communication with said remote computing device over said data network.

* * * * *

UNITED STATES PATENT AND TRADEMARK OFFICE

CERTIFICATE OF CORRECTION

PATENT NO. : 8,545,311 B2
APPLICATION NO. : 12/944394
DATED : October 1, 2013
INVENTOR(S) : Michael W. Shore et al.

It is certified that error appears in the above-identified patent and that said Letters Patent is hereby corrected as shown below:

In the Specification

Column 4, line 1, please delete “disclose” and insert therefore -- disclosed --;

Column 5, line 55, please delete “other” and insert therefore -- another --;

Column 5, line 67, please delete “digital” and insert therefore -- display --;

Column 6, line 56, please delete “for”;

Column 7, line 2, please delete “a” and insert therefore -- an --;

Column 7, line 24, please delete “as”;

Column 10, line 33, please delete “applications” and insert therefore -- application --;

Column 12, line 7, please delete “235” and insert therefore -- 245 --;

Column 14, line 12, please delete “500” and insert therefore -- 179 --;

Column 14, line 16, please delete “500” and insert therefore -- 179 --;

In the Claims

Column 20, Claim 20, line 7, please delete “a” and insert therefore -- an --;

Column 20, Claim 20, line 33, please delete “as”.

Signed and Sealed this
Twenty-ninth Day of July, 2014

Michelle K. Lee

Michelle K. Lee
*Deputy Director of the United States Patent and Trademark Office*